(12) United States Patent
Tegeltija et al.

(10) Patent No.: US 12,424,902 B2
(45) Date of Patent: Sep. 23, 2025

(54) GEARED MOTOR, IN PARTICULAR OF A GEARED MOTOR SERIES, HAVING AN ADAPTER PART

(71) Applicant: SEW-EURODRIVE GMBH & CO. KG, Bruchsal (DE)

(72) Inventors: Miki Tegeltija, Karlsdorf-Neuthardt (DE); Oliver Bühn, Kraichtal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 384 days.

(21) Appl. No.: 17/623,342

(22) PCT Filed: Jun. 15, 2020

(86) PCT No.: PCT/EP2020/025287
§ 371 (c)(1),
(2) Date: Dec. 28, 2021

(87) PCT Pub. No.: WO2020/259868
PCT Pub. Date: Dec. 30, 2020

(65) Prior Publication Data
US 2022/0368194 A1   Nov. 17, 2022

(30) Foreign Application Priority Data
Jun. 28, 2019   (DE) .................... 10 2019 004 512.2

(51) Int. Cl.
*H02K 7/116* (2006.01)
*F16H 57/02* (2012.01)
*H02K 7/00* (2006.01)

(52) U.S. Cl.
CPC ............. *H02K 7/116* (2013.01); *F16H 57/02* (2013.01); *H02K 7/003* (2013.01); *F16H 2057/02034* (2013.01); *H02K 2213/03* (2013.01)

(58) Field of Classification Search
CPC ...... F16H 57/02; F16H 57/025; F16H 57/033; F16H 57/022; F16H 57/023; F16H 59/38;
(Continued)

(56) References Cited

U.S. PATENT DOCUMENTS 5,895,992 A * 4/1999 Dreher .................... H02K 7/06
74/89.33
6,328,655 B1 * 12/2001 Mensing ............... F16H 57/025
464/178
(Continued)

FOREIGN PATENT DOCUMENTS

DE  102005046261 B4  12/2009
DE  102011103853 A1  12/2011
(Continued)

OTHER PUBLICATIONS

17623342_2024-05-16_JP_2001231220_A_H.pdf (Year: 2024).*
(Continued)

*Primary Examiner* — Christopher M Koehler
*Assistant Examiner* — Ahmed F Seck
(74) *Attorney, Agent, or Firm* — Carter, DeLuca & Farrell LLP

(57) ABSTRACT

A geared motor includes a gear unit, a first, a second, or a third electric motor, and an adapter part situated between the gear unit and the electric motor. On its side facing the electric motor, the adapter part has a first, a second, and a third centering device, and on the side facing away from the electric motor, it is connected to the gear unit. The centering devices are radially set apart from one another, and the second centering device is situated radially between the first and third centering devices. The electric motor has an axially protruding centering ring, which is centered by only a single one of the centering devices of the adapter part, and the other centering devices are radially set apart from the centering
(Continued)

ring and/or have no centering function, e.g., for the centering ring.

21 Claims, 25 Drawing Sheets

(58) Field of Classification Search
CPC .......... H02K 7/003; H02K 7/06; H02K 7/081; H02K 7/10; H02K 7/116; H02K 7/1163; H02K 7/1166; H02K 7/118; H02K 7/1185; H02K 11/38; H02K 49/102; H02K 51/00
See application file for complete search history.

(56) References Cited

U.S. PATENT DOCUMENTS

| | | | | |
|---|---|---|---|---|
| 10,240,669 | B2 | 3/2019 | Tegeltija | |
| 2009/0260463 | A1* | 10/2009 | Fukano | H02K 7/116 74/89.33 |
| 2013/0257198 | A1* | 10/2013 | Barton | H02K 5/203 310/54 |
| 2015/0096181 | A1* | 4/2015 | Plangger | G02B 26/105 33/290 |
| 2017/0107933 | A1* | 4/2017 | Favaron | B22D 25/02 |
| 2019/0181736 | A1* | 6/2019 | Fröhlich | H02K 9/19 |
| 2019/0379254 | A1* | 12/2019 | Denefleh | F16H 57/02 |

FOREIGN PATENT DOCUMENTS

| | | | | |
|---|---|---|---|---|
| DE | 102013003165 | A1 | 9/2013 | |
| DE | 102013011816 | B4 | 10/2015 | |
| DE | 102017010372 | A1 | 6/2018 | |
| DE | 102017010416 | A1 * | 6/2018 | |
| EP | 0567048 | A1 | 10/1993 | |
| EP | 1469233 | A1 * | 10/2004 | ............ F16H 57/02 |
| EP | 1795754 | A2 | 6/2007 | |
| FR | 2920380 | A1 | 3/2009 | |
| JP | 2001231220 | A * | 8/2001 | ............ H02K 13/00 |
| JP | 103982599 | A * | 8/2014 | ............... F16H 1/32 |
| WO | WO-2017126321 | A1 * | 7/2017 | |

OTHER PUBLICATIONS

CN103982599A_-_Translation.pdf (Year: 2024).*
EP1469233A1_-_Translation.pdf (Year: 2024).*
_DE_102017010416_A1_Translation.pdf (Year: 2025).*
WO202017126321A1-Translation.pdf (Year: 2025).*
International Search Report issued in corresponding International Application No. PCT/EP2020/025287 dated Sep. 18, 2020, pp. 1-2, English Translation.
Kalweit, A. et al., "Handbuch fur Technisches Produktdesign" Springer 2nd Edition (Jan. 2012) pp. 1-13, English-language abstract provided.
International Preliminary Report on Patentability issued in corresponding International Application No. PCT/EP2020/025287 dated Dec. 28, 2021, pp. 1-9.

* cited by examiner

GEARED MOTOR, IN PARTICULAR OF A GEARED MOTOR SERIES, HAVING AN ADAPTER PART

FIELD OF THE INVENTION

The present invention relates to a geared motor, for example, of a geared motor series, having an adapter part.

BACKGROUND INFORMATION

In certain conventional systems, a geared motor has an electric motor and a gear unit.

German Patent Document No. 10 2005 046 261 describes a flange connection of a geared motor.

European Patent Document No. 1 795 754 describes a universal flange.

German Patent Document No. 10 2011 103 853 describes a method for producing an electric motor.

German Patent Document No. 10 2013 011 816 describes a gear unit having a first and a second housing part.

SUMMARY

Example embodiments of the present invention provide a geared motor series which should be able to be produced in a cost-effective manner.

According to an example embodiment of the present invention, a geared motor, e.g., a geared motor series, includes an adapter part, a gear unit, and optionally either a first, a second, or a third electric motor. The adapter part is situated between the gear unit and the electric motor. On its side facing the electric motor, the adapter part, e.g., has a first, a second, and a third centering device, and on the side facing away from the electric motor is connected to the gear unit, e.g., to the housing of the gear unit. The centering devices are situated at a radial distance from one another, and the second centering device is situated radially between the first centering device and the third centering device. The radial direction relates, e.g., to the axis of rotation of the rotor of the electric motor, and the electric motor has an axially protruding centering ring, which is centered, e.g., by only a single one of the centering devices of the adapter part, and the other centering devices are radially set apart from the centering ring and/or have no centering function, especially for the centering ring.

This offers the advantage that the geared motor series is made up of geared motors which may have the same adapter part and the same gear unit but different electric motors. As a result, the adapter part can be used for connecting the same gear unit to different electric motors. During the production of the geared motor, the adapter part thus is connected to the gear unit and an electric motor which is selected from a number of different electric motors. A high variance can therefore be provided using a low number of components.

A first one of the variants of the geared motor series has a first electric motor. A second one of the variants of the geared motor series has a second electric motor. A third one of the variants of the geared motor series has a third electric motor.

The electric motors are of different sizes and thus belong to a different performance category. At its end region facing the adapter part, the outer circumference of the electric motors is round, e.g., cylindrical.

Example embodiments of the present invention thus provide three geared motors. The first gear motor has a first electric motor in which the first centering device carries out the centering function. The second geared motor has a second electric motor in which the second centering device carries out the centering function. The third geared motor has a third electric motor in which the third centering device carries out the centering function, e.g., via an adapter frame part which is situated between the third electric motor and the adapter part.

Each one of the centering rings, for example, covers only a single radial distance range that is set apart from the radial distance range covered by the rotor.

The adapter part therefore always has two unused centering devices that are arranged on the adapter part simply because other variants can also be produced with the aid of the adapter part.

According to example embodiments, the region covered by the adapter part in the axial direction overlaps with the region covered by the rotor in the axial direction. This offers the advantage that the rotor projects axially through the adapter part.

According to example embodiments, a round hole, which extends axially through the adapter part as a first centering device, a first centering step as a second centering device, and a second centering step as a third centering are arranged on the adapter part.

This offers the advantage that three centering devices are able to be produced simply by shaping.

According to example embodiments, in the circumferential direction, the edges of the round hole, the first centering step, and the second centering step extend with interruptions in the circumferential direction in each case. This is considered advantageous because it provides not only savings in terms of material but also a direct heat conduction path from the rotatable part, i.e., the rotor, by the air-filled interruptions to the adapter part. The air is moved along by the rotating part so that a convectively and actively driven air circulation is induced, and thus a better heat conduction is achieved.

According to example embodiments, the adapter part is pressed toward the electric motor with the aid of screws, e.g., with the aid of the screw heads of screws, the screws, for example, being at least partly screwed into a respective, especially axially directed, threaded bore of the electric motor. This offers the advantage that a simple and cost-effective fastening is able to be provided.

According to example embodiments, the adapter part has elongated holes, which are, e.g., situated at a second radial distance, and uninterrupted holes, e.g., round holes, situated at a first radial distance. The second radial distance, for example, is being greater than the first radial distance, and the screws either project through the holes, and the elongated holes are sealed by material of the adapter part, e.g., with the aid of a respective flash leaf (or cast sheet), or project through the elongated holes, the elongated holes having an uninterrupted configuration.

The elongated holes, for example, have a greater extension in the radial direction than in the circumferential direction in each case. This has the advantage that in the first motor, and thus the smallest motor, the elongated hole projects radially beyond the motor yet no oil escapes and no dirt enters the interior space of the adapter part.

According to example embodiments, the holes and the elongated holes are situated in radially inwardly protruding projections provided on the adapter part. This is considered advantageous because the screws are able to be provided in the radial distance region covered by the centering device(s).

According to example embodiments, the radial distance region covered by the elongated holes encompasses and/or contains the greatest radial distance of the contact surface between the first motor and the adapter part. This is considered advantageous insofar as the elongated holes radially project beyond the motor and the elongated holes may therefore be provided in a sealed form.

According to example embodiments, the round hole is adapted to accommodate and center the centering ring of the first electric motor. This is considered advantageous insofar as simple centering is provided.

According to example embodiments, the first centering step is adapted to accommodate and center the centering ring of the second electric motor, the centering ring of the second electric motor having a greater diameter than the centering ring of the first electric motor. This has the advantage of providing uncomplicated centering.

According to example embodiments, the second centering step is adapted to accommodate and center the centering ring of an adapter frame part of the third electric motor, the centering ring of the adapter frame part having a greater diameter than the centering ring of the second electric motor. A round hole for accommodating and centering the centering ring of the third electric motor is arranged on the adapter frame part, e.g., the radial distance region covered by the centering ring of the third electric motor being situated radially outside the radial distance region covered by the centering ring of the second electric motor. This offers the advantage that the third motor is able to be connected to the adapter part with the aid of the adapter frame part as if the third motor had a centering ring whose radial distance would match the second centering step of the adapter part. As an alternative, the motor could also be arranged in one piece with the adapter frame part.

According to example embodiments, the housing of the first motor is accommodated in the second centering step with existing play in the radial direction. This offers the advantage that support but no centering can take place at the second centering step. This is because the centering of the first motor is arranged in the round hole.

According to example embodiments, the adapter part is a high-pressure die casting part, e.g., a high-pressure die casting zinc part, and the flash leaf, or cast sheet, e.g., has a wall thickness. This offers the advantage that the dimensional accuracy is very high and postprocessing can therefore be dispensed with. When the elongated holes are used, only the removal of the flash leaf is required, which should not be referred to as postprocessing, however. Postprocessing is understood here as describing machining such as milling or grinding.

According to example embodiments In one advantageous embodiment, the material, e.g., the flash leaf, has a wall thickness that ranges from 0.2 mm to 0.8 mm, e.g., from 0.3 mm to 0.5 mm. This is considered advantageous insofar as the flash leaf is able to be removed when the screws are introduced. Thus, no postprocessing and also no other particular effort is required for the removal.

According to example embodiments, the adapter part has an axially protruding projection, which at least partially protrudes into one of the elongated holes. This offers the advantage that the alignment in the circumferential direction is able to be carried out in a defined manner.

According to an example embodiment of the present invention, in a method for producing a geared motor of a geared motor series, the geared motor is produced from an adapter part, a gear unit, and optionally either a first, a second, or a third electric motor. The adapter part is situated between the gear unit and the selected electric motor, and the adapter part has a first, a second, and a third centering device on its side facing the selected electric motor and is connected to the gear unit, e.g., to the housing of the gear unit, on the side facing away from the selected electric motor. The centering devices are radially set apart from one another and the second centering device is situated radially between the first centering device and the third centering device, and the radial direction is related, e.g., to the axis of rotation of the rotor of the selected electric motor. The selected electric motor has an axially protruding centering ring, which centers the selected electric motor by only a single one of the centering devices of the adapter part when the selected electric motor is connected to the adapter part, and the other centering devices are radially set apart from the centering ring and/or have no centering function, e.g., for the centering ring.

This has the advantage that a high number of variants of geared motors is achievable with the aid of a few components. This is because the adapter part already provides three different centerings, and the individually selected motor uses only a single centering. The two other centerings are provided for other motors.

Further features and aspects of example embodiments of the present invention are described in greater detail below with reference to the appended schematic Figures.

BRIEF DESCRIPTION OF THE DRAWINGS

Instead of motor 1.

Instead of motor 1.

DETAILED DESCRIPTION

Figure 1:
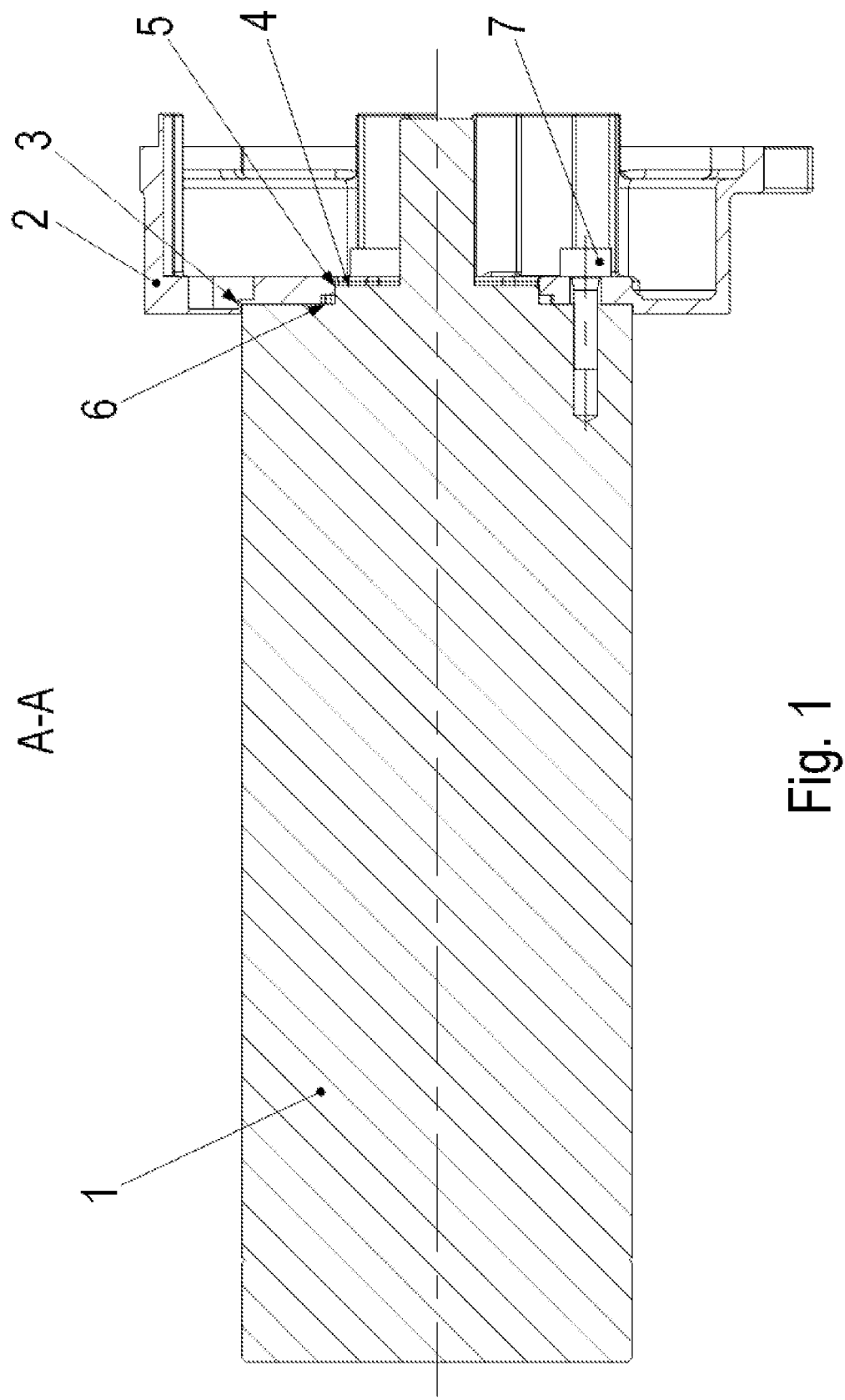
FIG. 1, in a longitudinal cross-sectional view, illustrates a first motor 1 having a connected, unmachined adapter part 2, e.g., an adapter housing part, for a connection to a gear unit.

As schematically illustrated in the Figures, the drive according to an example embodiment of the present invention has a gear unit which is adapted to be driven by different motors 1, 31, 51 via an unmachined or machined adapter part 2 including an adapter frame part 52, as the case may be.

Adapter part 2 has a centering device, e.g., two centering steps 3, 6 and a centering round hole 5, for the motors 1, 31, 51 of different sizes, so that adapter part 2 is able to be used for all motors 1, 31, 51.

For example, adapter part 2 is able to be produced by pressure die casting using zinc, so that no postprocessing has to be carried out because of the very high accuracy of this production method. Only the third, i.e., the largest, motor is connected to adapter part 2 via an adapter frame part 52.

For the connection to the different motors 1, 31, 51, adapter part 2 is provided not only with different centering devices but also different axially uninterrupted recesses, e.g., bore patterns. One of the recesses is arranged as an elongated hole 21 for this purpose.

The gear unit is, for example, arranged as a planetary gear. Via its side facing the gear unit, adapter part 2 is connected to the gear unit. On the motor side, the interface provided on adapter part 2 has different features such as centering device(s), e.g., a round centering hole 5, and centering steps 6, 3 of different diameters.

On the A-side, e.g., on its output side, each motor 1, 31, 51 has an axially protruding centering ring 4, 32, 53, which, however, has a different outer diameter in each case.

The centering ring 4, 32 protruding at the first or second motor 1, 31 or centering ring 120 axially protruding on adapter frame part 52 is accommodated and aligned at a respective centering device such as round centering hole 5 or a centering step 6, 3 of adapter part 2. In the axial direction, the respective motor 1, 31 is tightly attached with the aid of screws 7, 30, 50.

Figure 2:
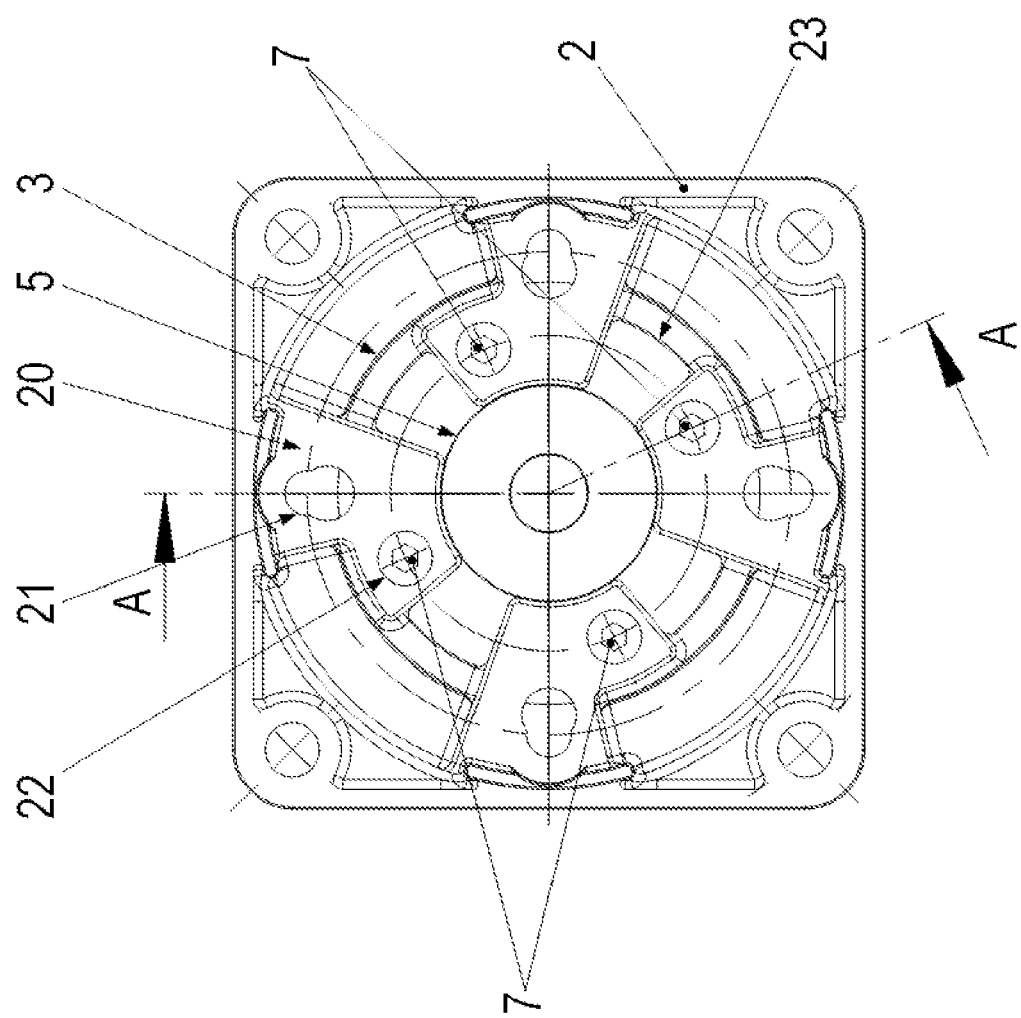
FIG. 2 is a cross-sectional view with FIG. 1.

As illustrated in FIG. 1 and FIG. 2, first motor 1, e.g., an electric motor, has a cylindrical outer shape from which a centering ring 4 and a rotor axially project toward adapter part 2 and/or toward the gear unit. The rotor is rotatably mounted with respect to the centering ring 4, 32, 53, which protrudes at the otherwise substantially cylindrical housing.

Adapter part 2 has a stepped recess, which particularly resembles a stepped bore but is not machined.

Adapter part 2 is, for example, produced as a pressure die casting zinc part and then not machined because this pressure die casting production is able to be achieved with sufficient accuracy.

The stepped recess includes an edge of an axially uninterrupted round hole 5, the edge being interrupted in the circumferential direction. Round hole 5 is arranged as a first centering device for centering ring 4 of first motor 1. Centering ring 4 of first motor 1 is accommodated in this axially uninterrupted round hole 5 and at least partially projects into it. First motor 1 is therefore centered at round hole 5.

With its housing, e.g., with its largest diameter of the contact region toward adapter part 2, the motor rests axially against second centering step 3 of adapter part 2 and is compressed by screws 7, e.g., their screw heads, that pass through adapter part 2 and are screwed into threaded bores of first motor 1.

Screws 7 are inserted through axially uninterrupted round holes 22 of adapter part 2, these round holes 22 being situated at a first radial distance in relation to the axis of rotation of the rotor shaft. The first radial distance lies radially outside centering ring 4 and thus also radially outside round hole 5.

The radially outer edge of the housing of first motor 1 is axially pressed against second centering step 3 of adapter part 2 but has radial play because the centering of first motor 1 takes place via round hole 5 while centering step 3 is used only for the axial restriction.

Second centering step 3 is situated at a third radial distance, which lies radially outside the two other centering devices, i.e., round hole 5 and first centering step 6.

Round hole 5 is situated at the first radial distance. First centering step 6 is situated at the second radial distance, and second centering step 3 is situated at the third radial distance.

Figure 7:
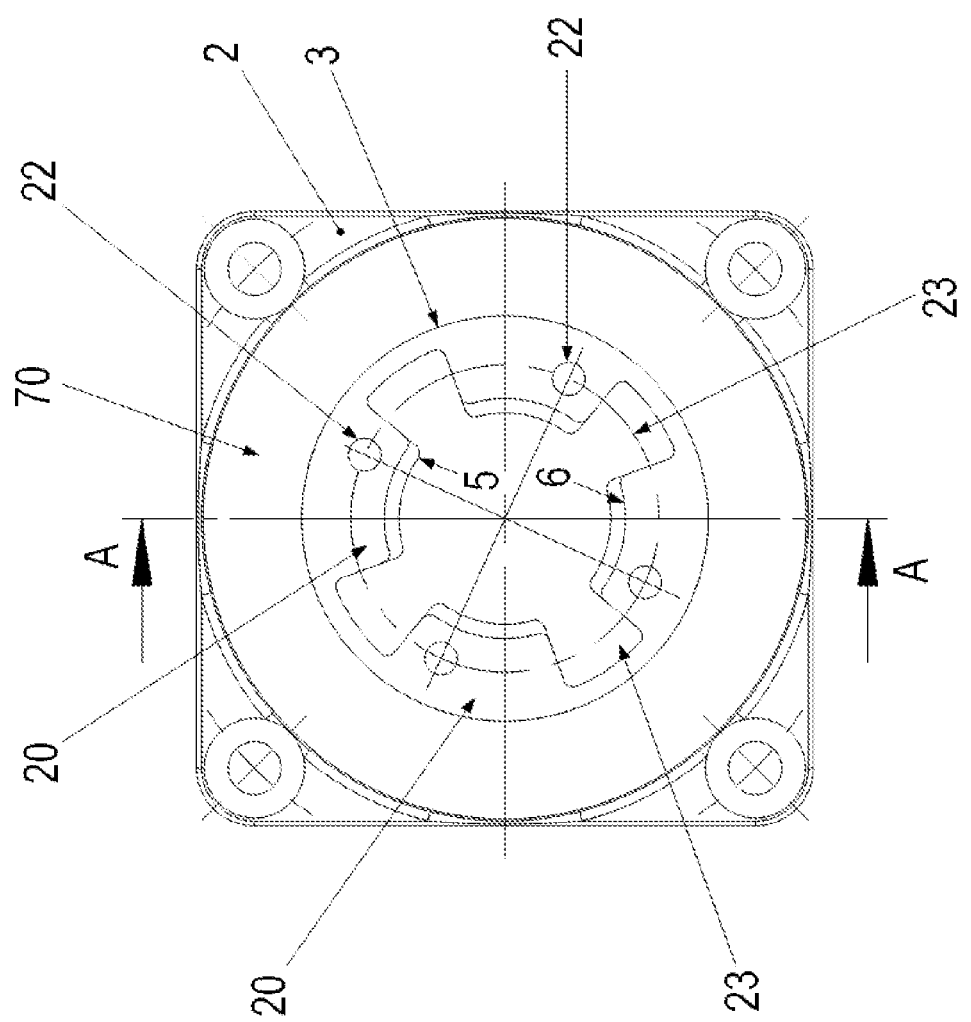
FIG. 7 is a top view of unmachined adapter part 2.
Figure 8:
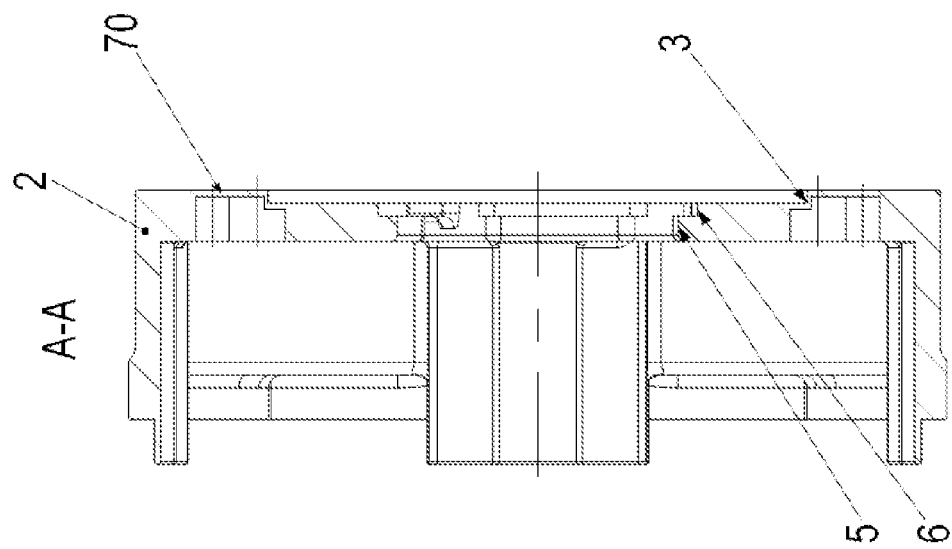
FIG. 8 is a cross-sectional view associated with FIG. 7.

Elongated hole 21 illustrated in FIG. 2 covers a radial distance region that encompasses the third radial distance. However, as illustrated in FIGS. 7 and 8, this elongated hole 21 is sealed by a flash leaf 70 because the adapter part for the connection to first motor 1 is used in its original form. The flash leaf has a wall thickness ranging from 0.2 mm to 0.8 mm, e.g., from 0.3 mm to 0.5 mm.

Thus, elongated hole 21 is premolded in adapter part 21 from the direction of the gear unit yet is still sealed by a flash leaf 70 in the direction of first motor 1. This is important because the radial distance region covered by elongated hole 21 and also by flash leaf 70 includes the outer diameter of first motor 1. Without flash leaf 70, the elongated hole would be arranged to pass axially through adapter part 2, and in the event of a leak in the gear unit, e.g., oil escaping from the gear unit into the interior of the adapter could enter the environment through elongated hole 21. The drive would then no longer be oiltight.

First centering step 6 is situated radially between round hole 5 and second centering step 3.

Figure 3:
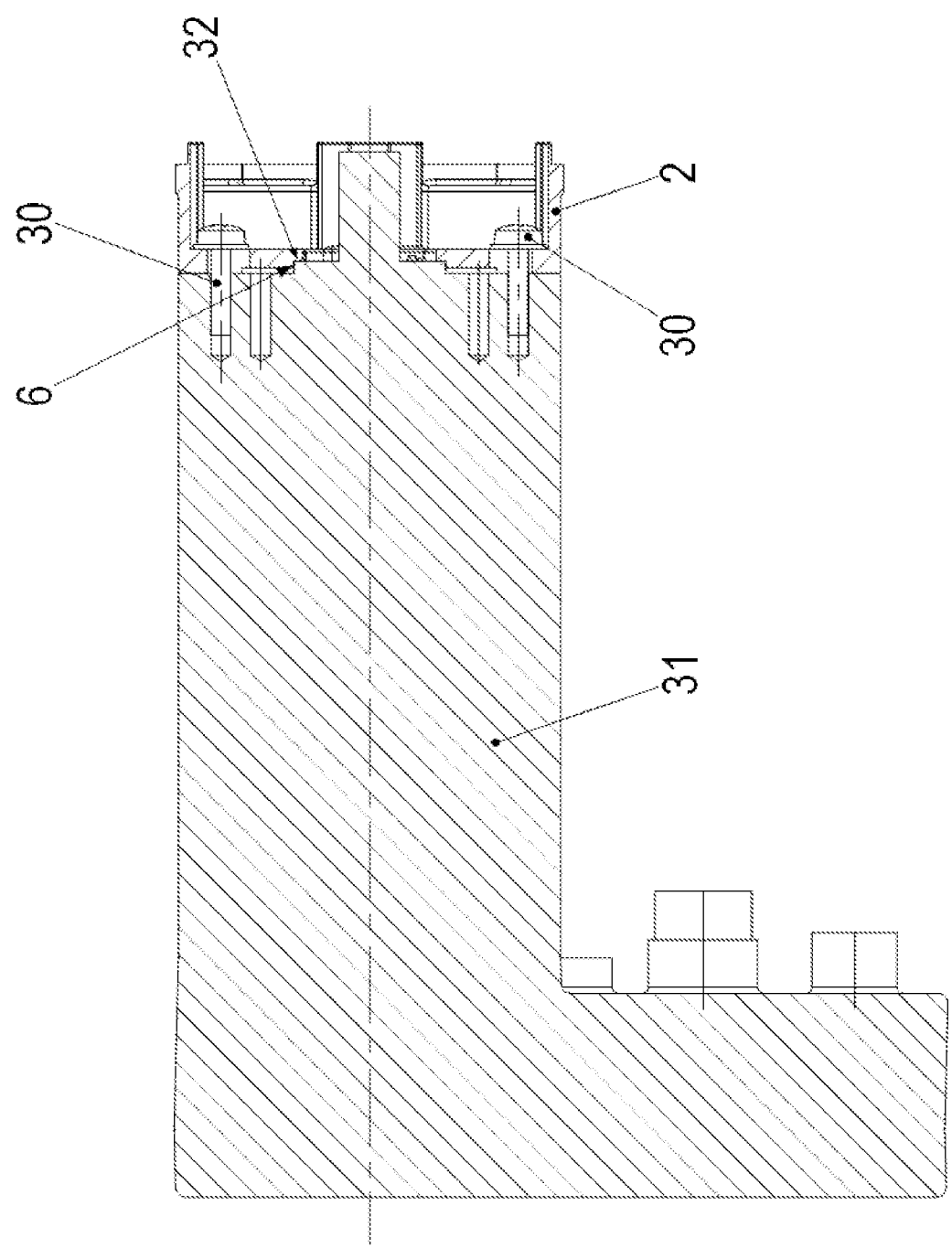
FIG. 3 is a longitudinal cross-sectional view of a second motor 31, which is connected to machined adapter part 2, and whose outer diameter is greater than the outer diameter of first motor 1.
Figure 4:
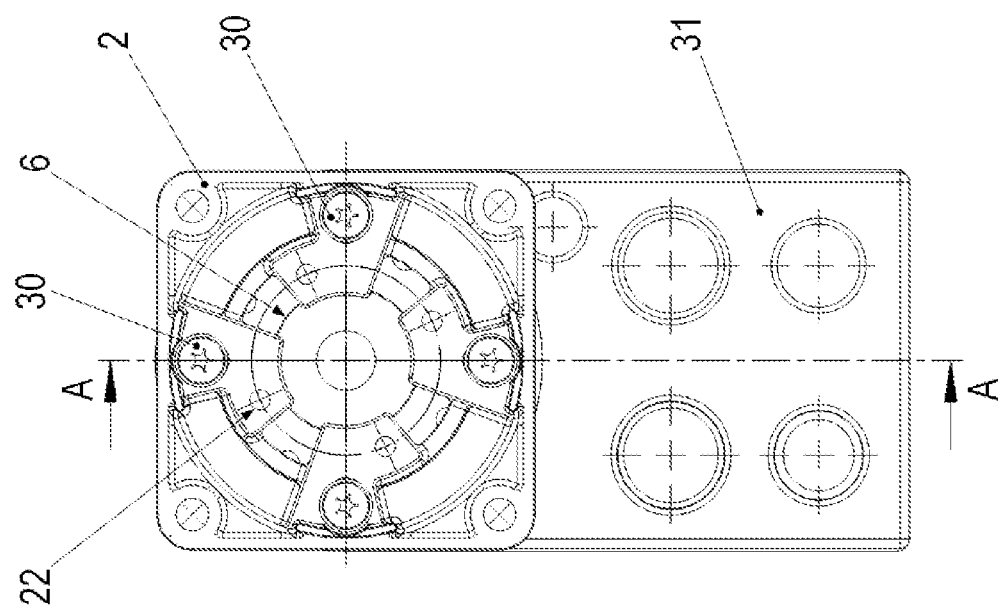
FIG. 4 is a cross-sectional view associated with FIG. 3.

As illustrated in FIGS. 3 and 4, with its centering ring 32 which, however, has a larger diameter than centering ring 4 of first motor 1, second motor 31, e.g., an electric motor, is accommodated in first centering step 6 of adapter shaft 2, against which it rests such that second motor 31 is centered with respect to adapter part 2. No significant play exists. This is because centering ring 32 is pressed into first centering step 6 and therefore positioned at this centering step 6 both radially and axially.

In the axial direction, second motor 31 thus rests against adapter part 2 so that the relative positioning of second motor 31 relative to adapter ring 2 can be achieved with great accuracy.

Using screws 30 whose screw heads cover a radial distance that includes the radial distance region covered by second centering step 3, adapter part 2 is pressed against the housing of first motor 1 by the screw heads of screws 30.

The outer diameter of the housing of second motor 31, e.g., the outer diameter of the surface region of second motor 31 touching adapter part 2, is greater than the outer diameter of the housing of first motor 1, e.g., the outer diameter of the surface region of first motor 1 touching adapter part 2.

Figure 9:
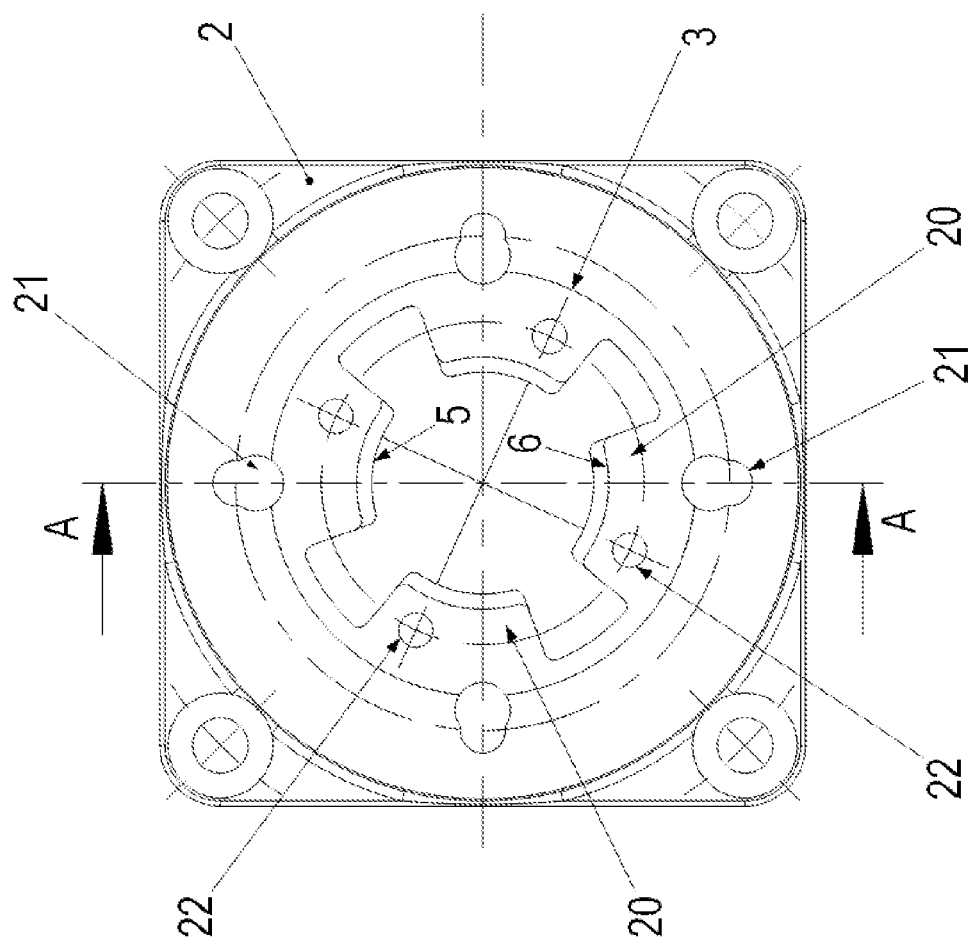
FIG. 9 is a top view of machined adapter part 2.
Figure 10:
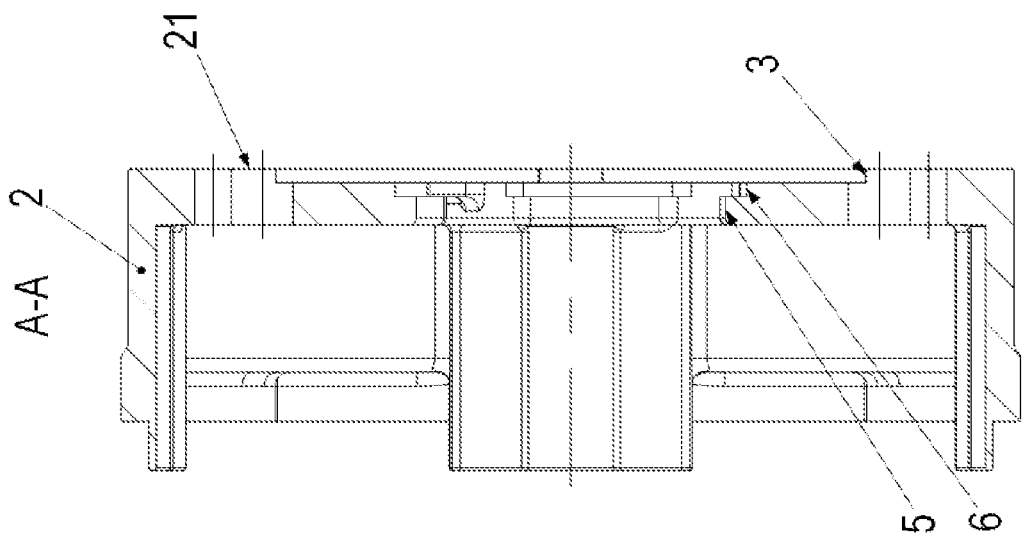
FIG. 10 is a cross-sectional view associated with FIG. 9.

In the exemplary embodiment illustrated in FIGS. 3 and 4, elongated hole 21 is axially uninterrupted in that flash leaf 70 is removed, as also illustrated in FIGS. 9 and 10.

Figure 5:
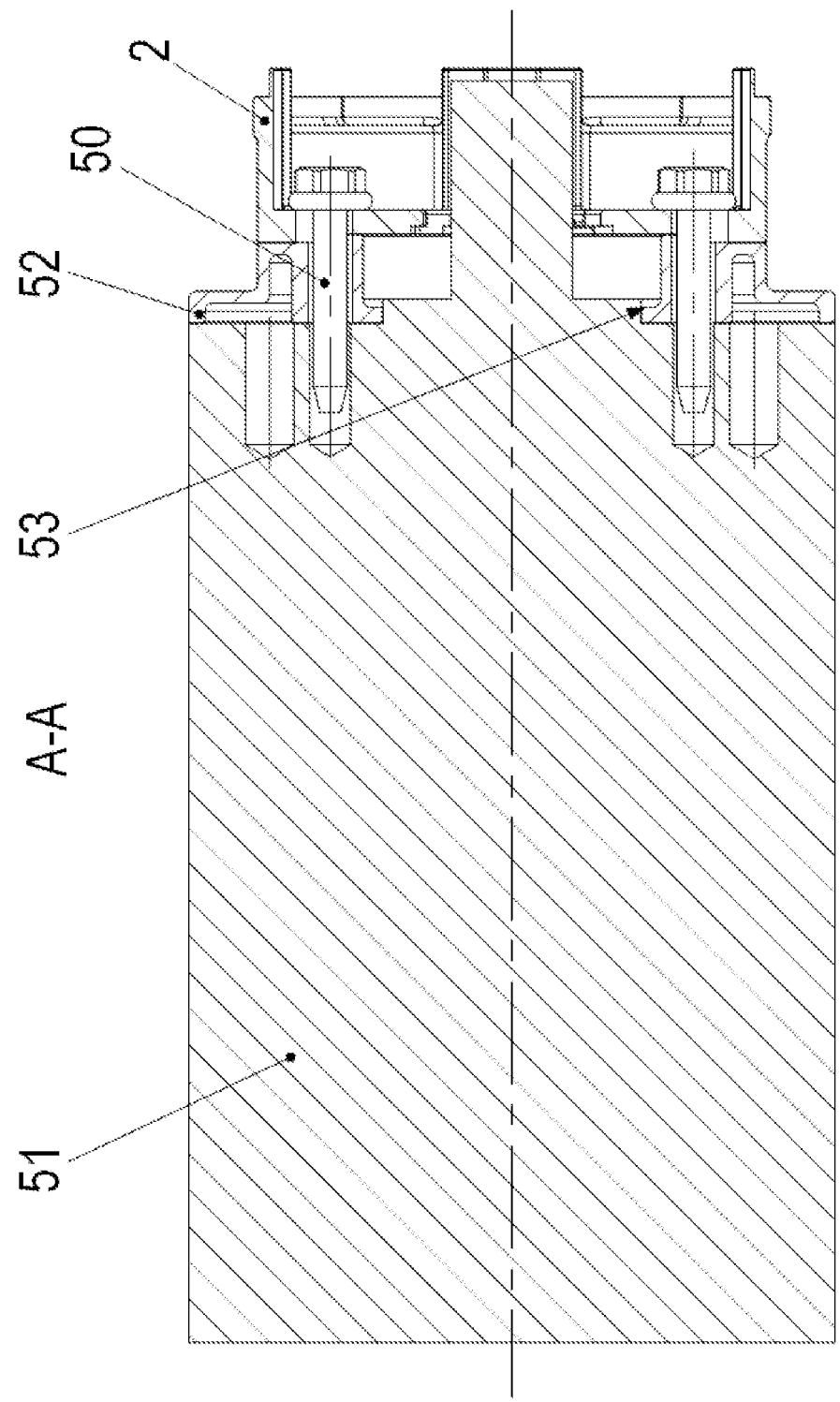
FIG. 5 is a longitudinal cross-sectional view of a third motor 51, which is connected to machined adapter part 2 and an adapter frame part 52, and whose outer diameter is greater than the outer diameter of second motor 31.
Figure 6:
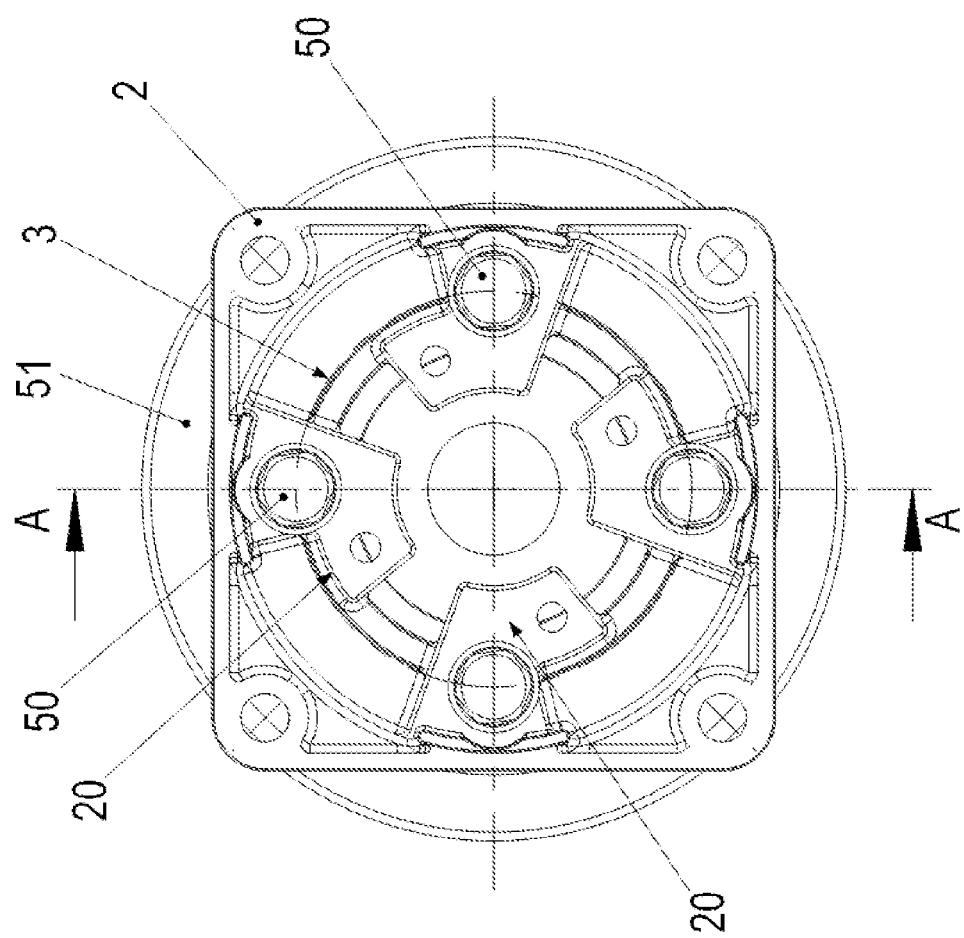
FIG. 6 is a cross-sectional view associated with FIG. 5.

Elongated hole 21 also allows screws 50 to be guided through adapter part 2, as illustrated in FIG. 5 and FIG. 6. This makes it possible to connect third motor 51.

However, an adapter frame part 52 through which screws 50 also project is situated axially between adapter part 2 and third motor 51.

The outer diameter of the housing of third motor 51, e.g., the outer diameter of the surface region of third motor 51 touching adapter frame part 52, is greater than the outer diameter of the housing of second motor 31, e.g., the outer diameter of the surface region of second motor 31 touching adapter part 2.

Once again, flash leaf 70 is thus removed, e.g., penetrated.

The centering of third motor 51 relative to adapter frame part 52 is accomplished by accommodating centering ring 53 of third motor 51 in an axially uninterrupted, cylindrically shaped hole of adapter frame part 52. Adapter frame part 52 rests axially against the housing of third motor 51.

Adapter frame part 52 itself in turn is centered with respect to adapter part 2 by an axially protruding centering ring 120, which is premolded on adapter frame part 52 and rests without play in second centering step 3 so that adapter frame part 52 is centered with respect to adapter part 2.

The axially uninterrupted holes for the screws 7, 30, 50 are situated in the radially inwardly protruding projections 20, which are set apart from one another in the circumferential direction, especially at regular intervals. Projections 20, for example, have the same shape and/or same configuration. A recess 23 is thereby provided on adapter part 2 between projections 20 in the circumferential direction in each case, which contributes to greater dimensional accuracy of round hole 5 and first centering step 6, e.g., because of the reduced circumference of each centering step 5, 6 in the circumferential direction, and thus reduces statistically possible outliers. In addition, the air-filled respective recess provide a heat transport from the rotor of the motor 1, 31, 51 to the adapter part 2, which means that better cooling of the rotor is achievable. The main source of heat is the bearing of the rotor of the respective motor 1, 31, 51 accommodated in the housing of the individual motor 1, 31, 51.

Figure 11:
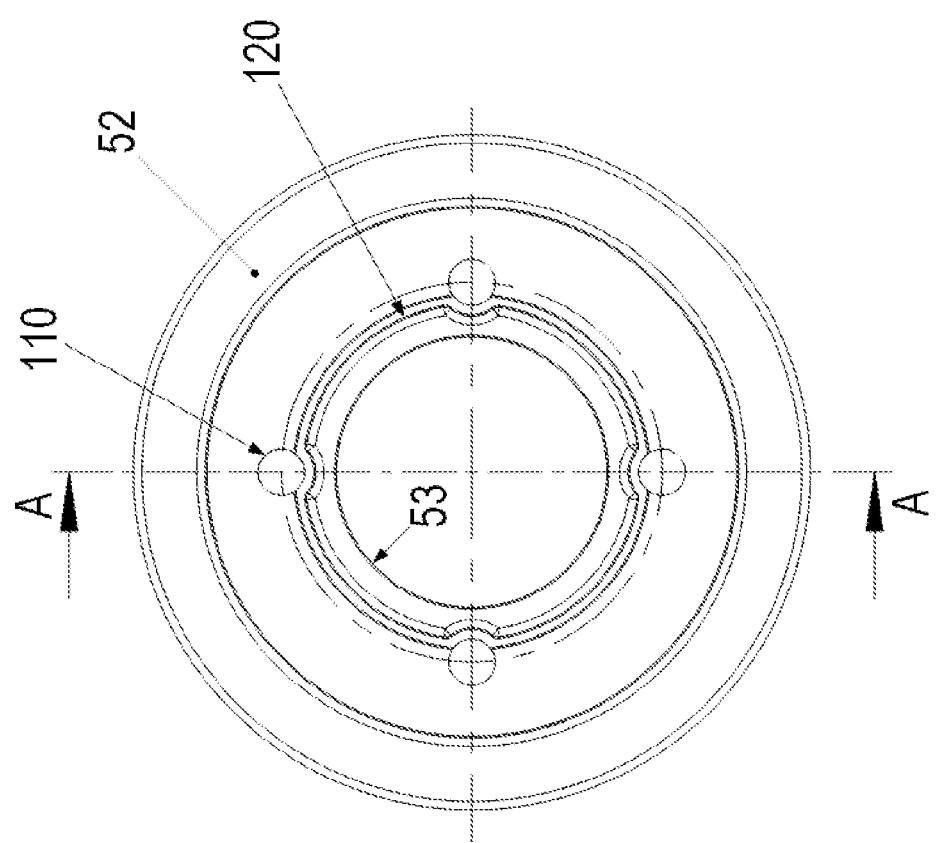
FIG. 11 is a top view of adapter frame part 52.
Figure 12:
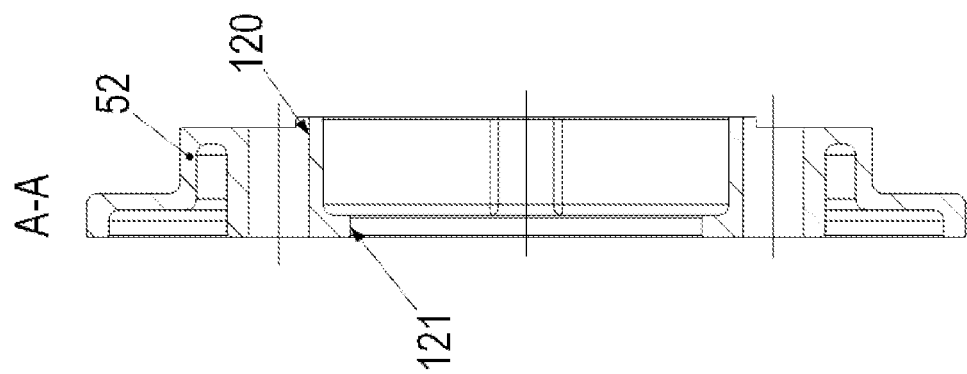
FIG. 12 is a cross-sectional view associated with FIG. 11.
Figure 13:
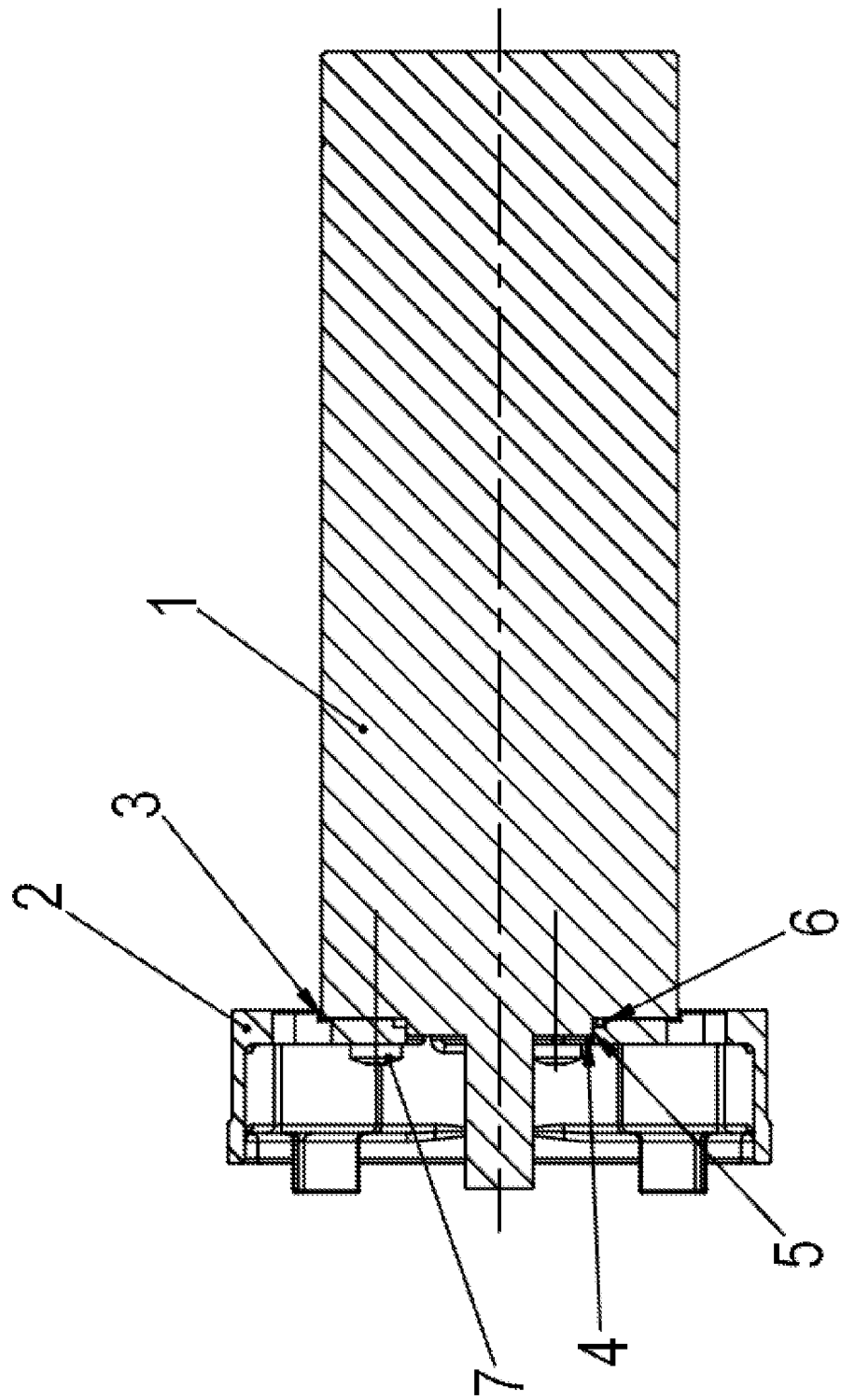
FIGS. 13 to 22 show the same views as FIGS. 1 to 12 for a second example embodiment, which differs from the example embodiment shown in FIGS. 1 to 12 only by centering fins 140 that are rotated by 45° for the centering on the gear-unit side, and by a different shape.
Figure 14:
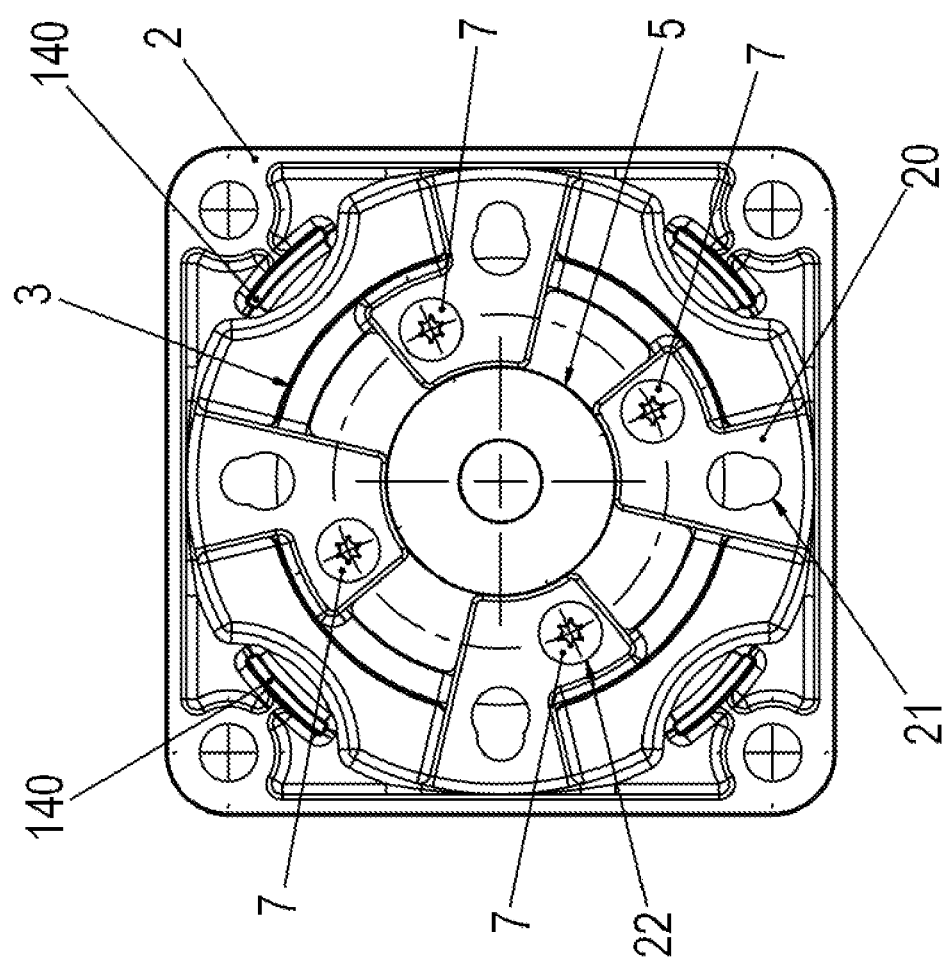
Figure 15:
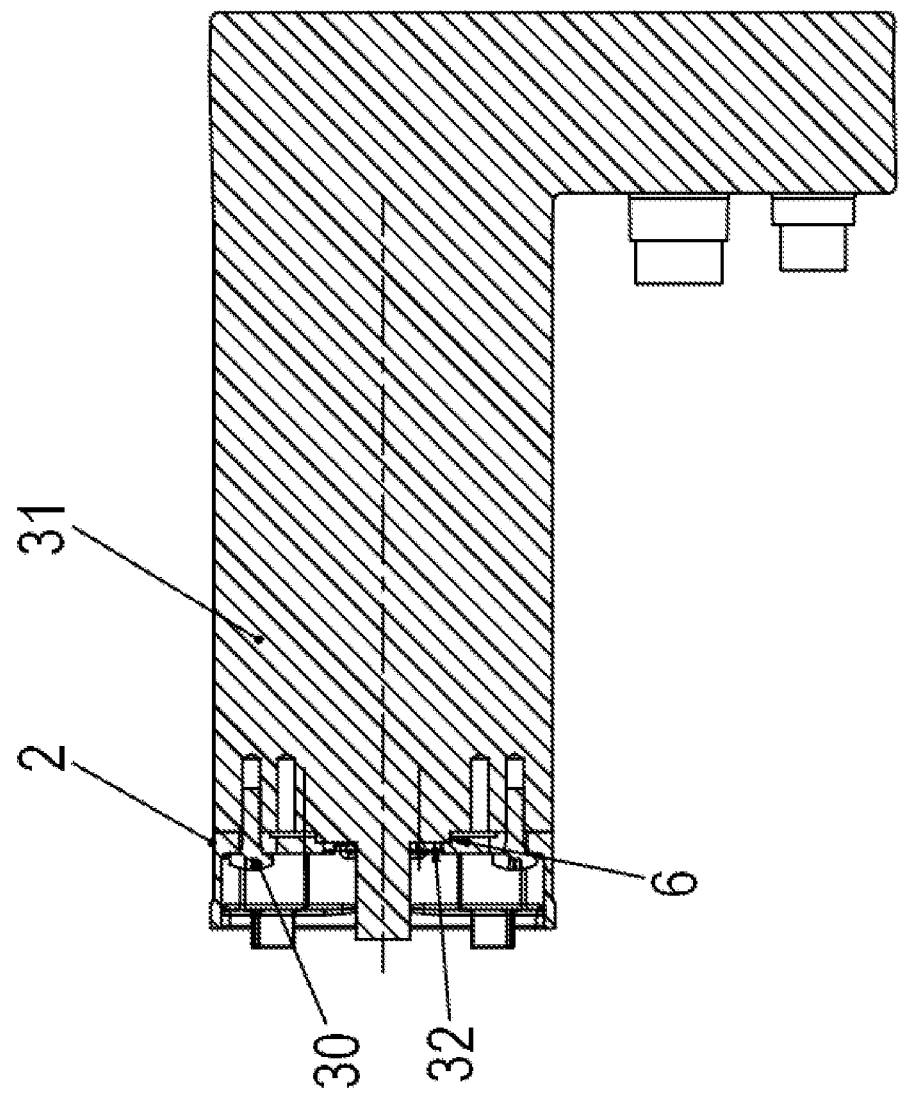
Figure 16:
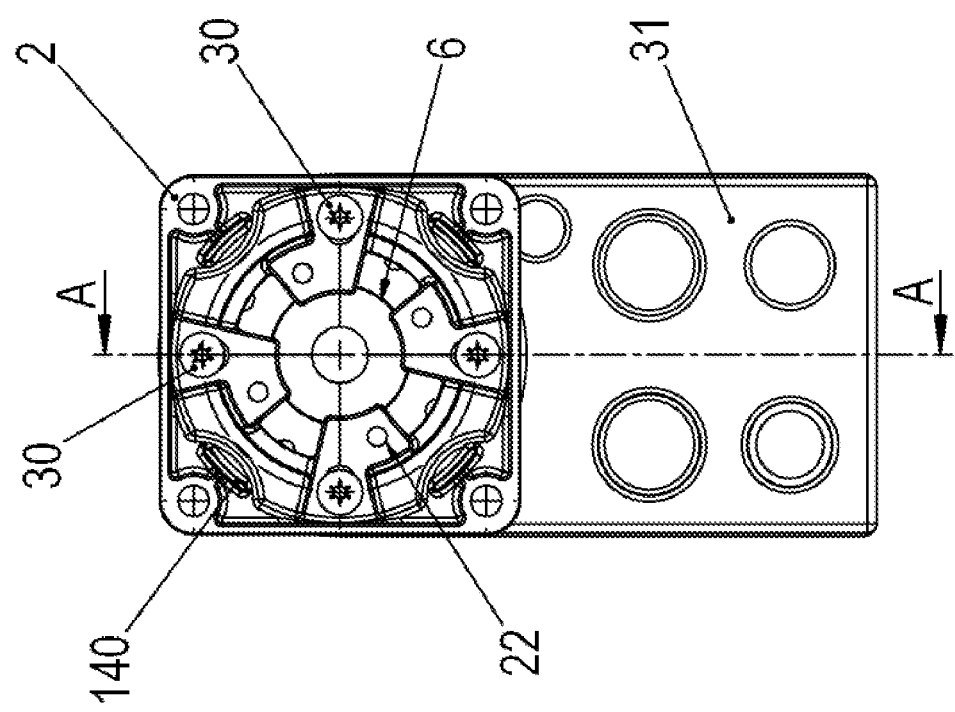
Figure 17:
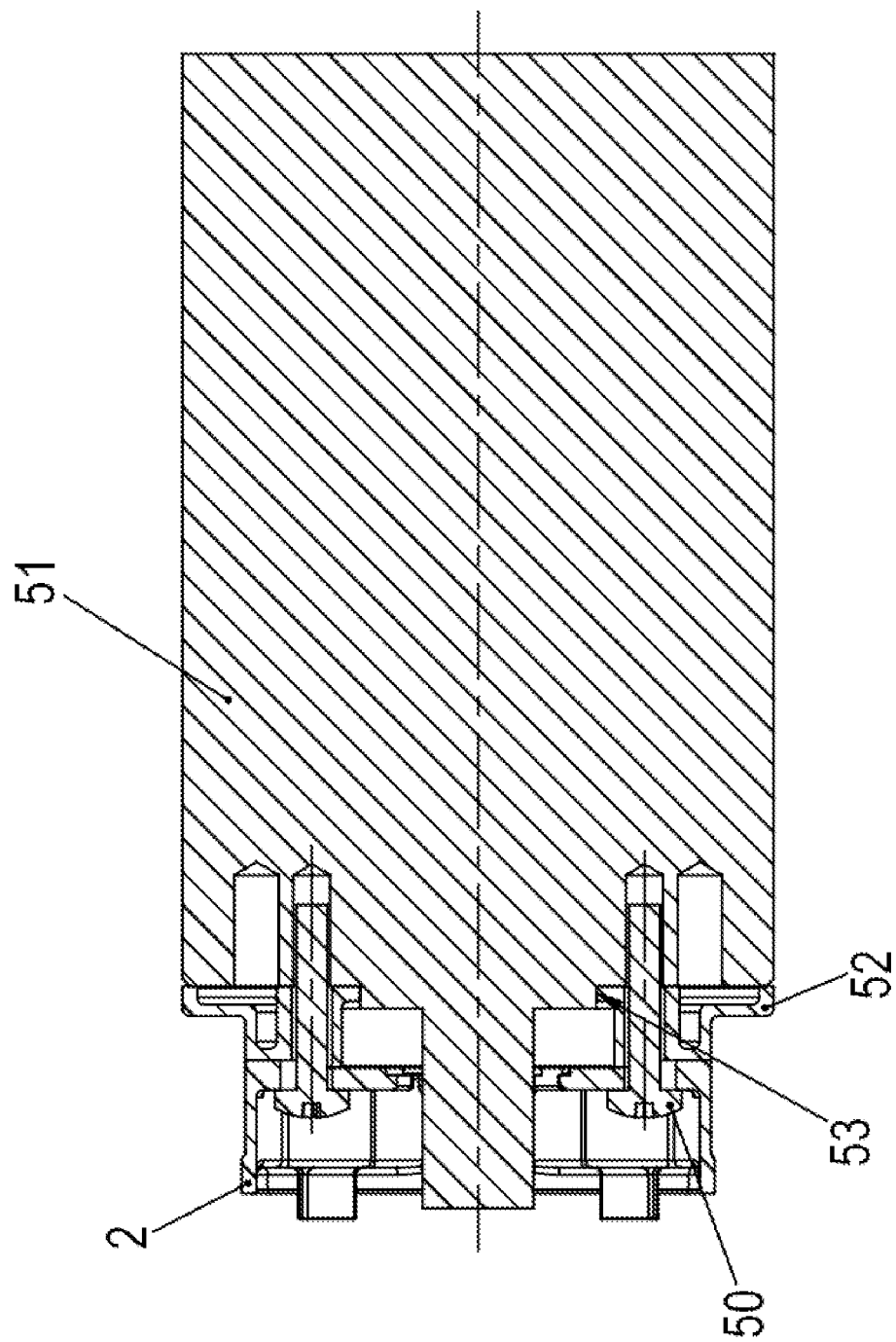
Figure 18:
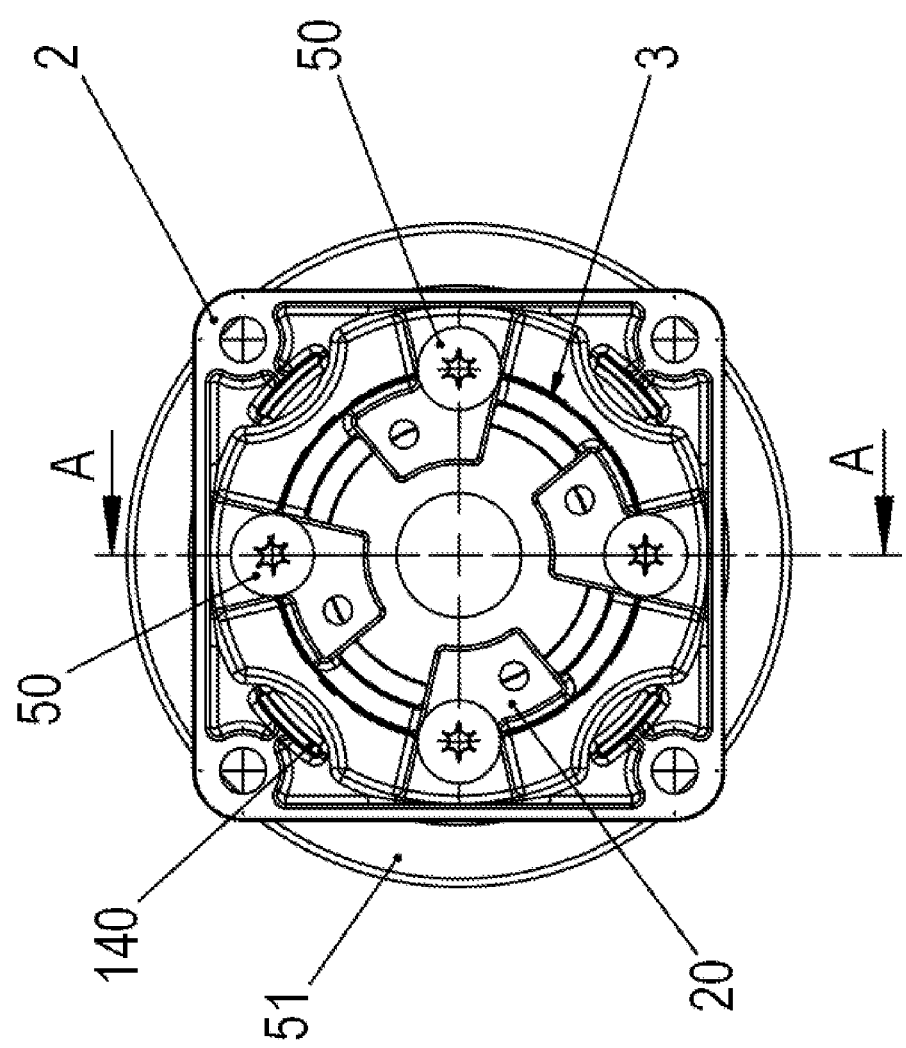
Figure 19:
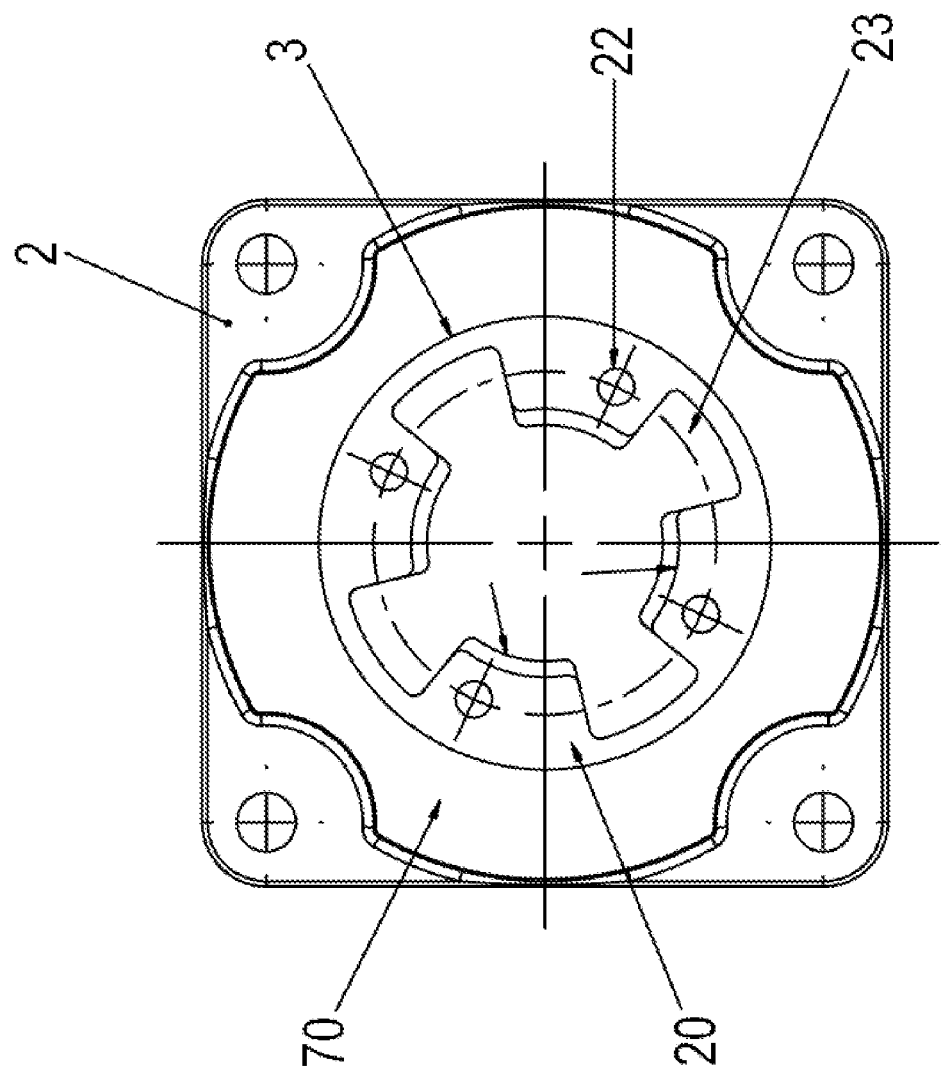
Figure 20:
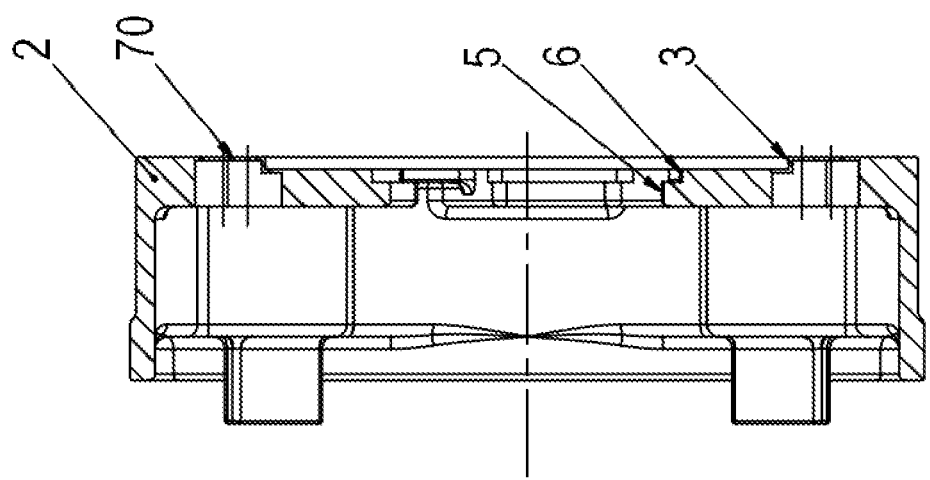
Figure 21:
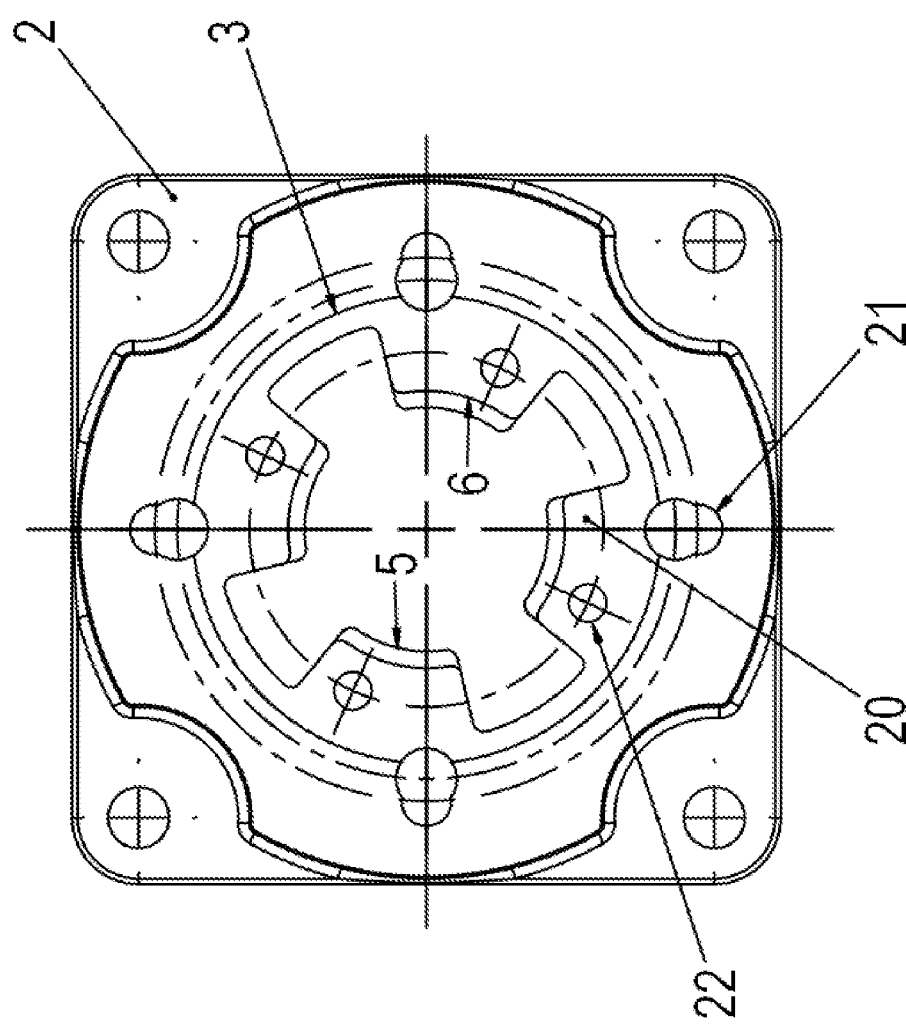
Figure 22:
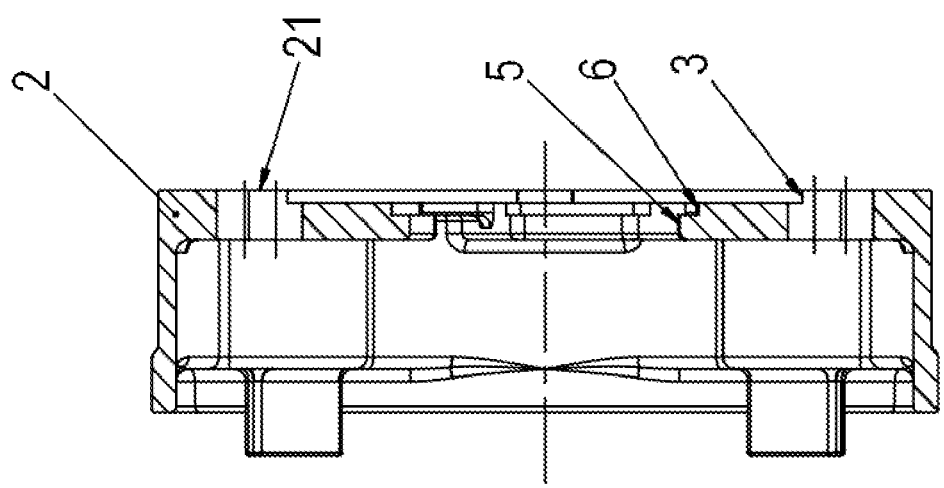
Figure 23:
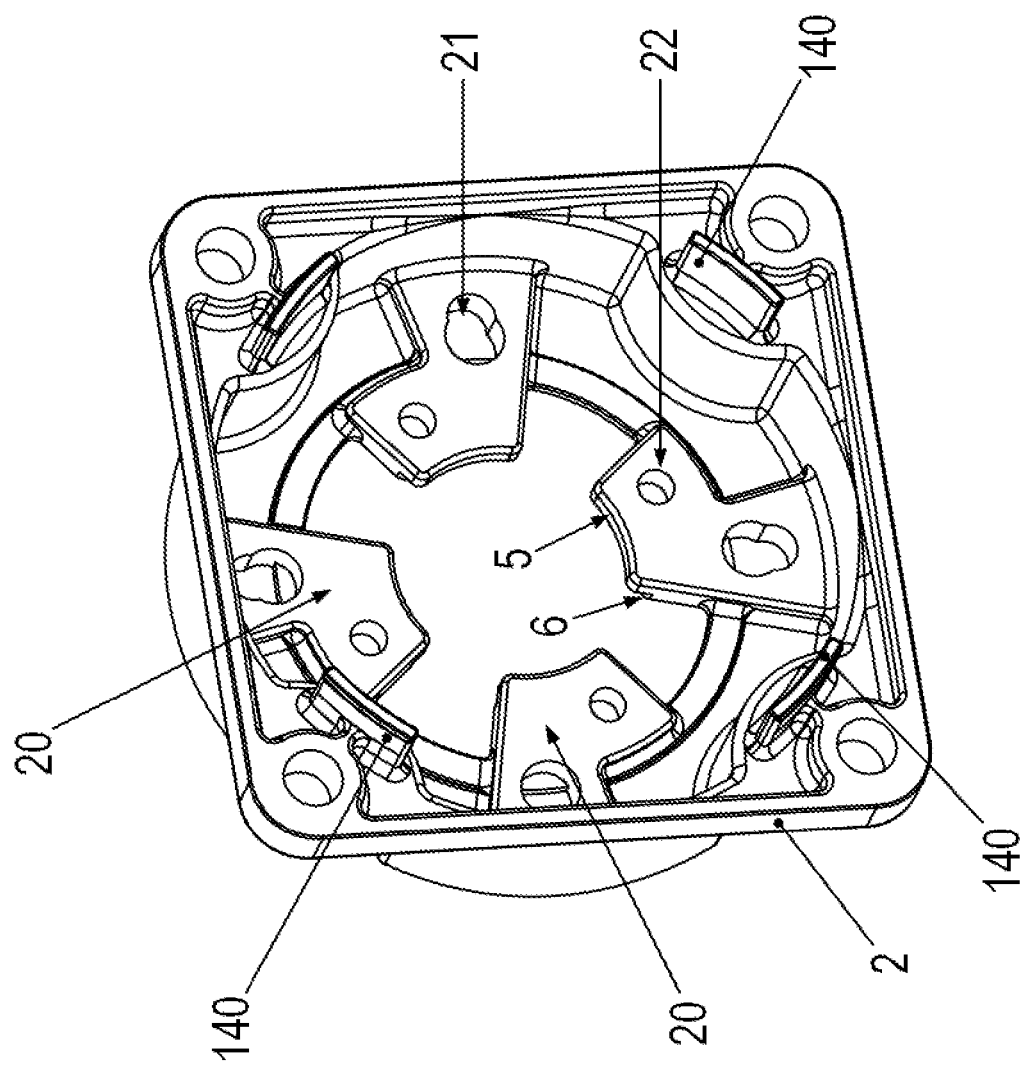
FIG. 23 is a perspective view from a first viewing direction of machined adapter part 2 including centering fins 140.
Figure 24:
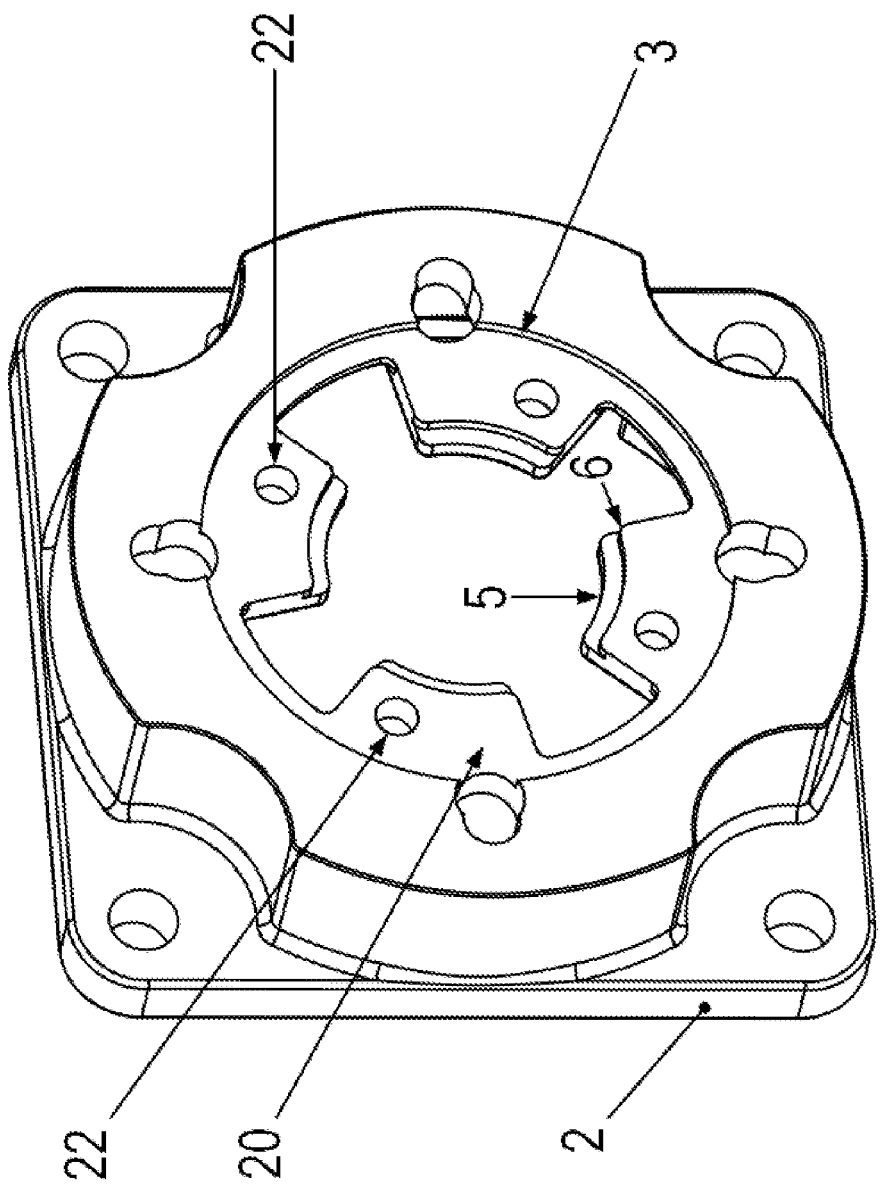
FIG. 24 is a perspective view of adapter part 2 illustrated in FIG. 23 from a different viewing direction.
Figure 25:
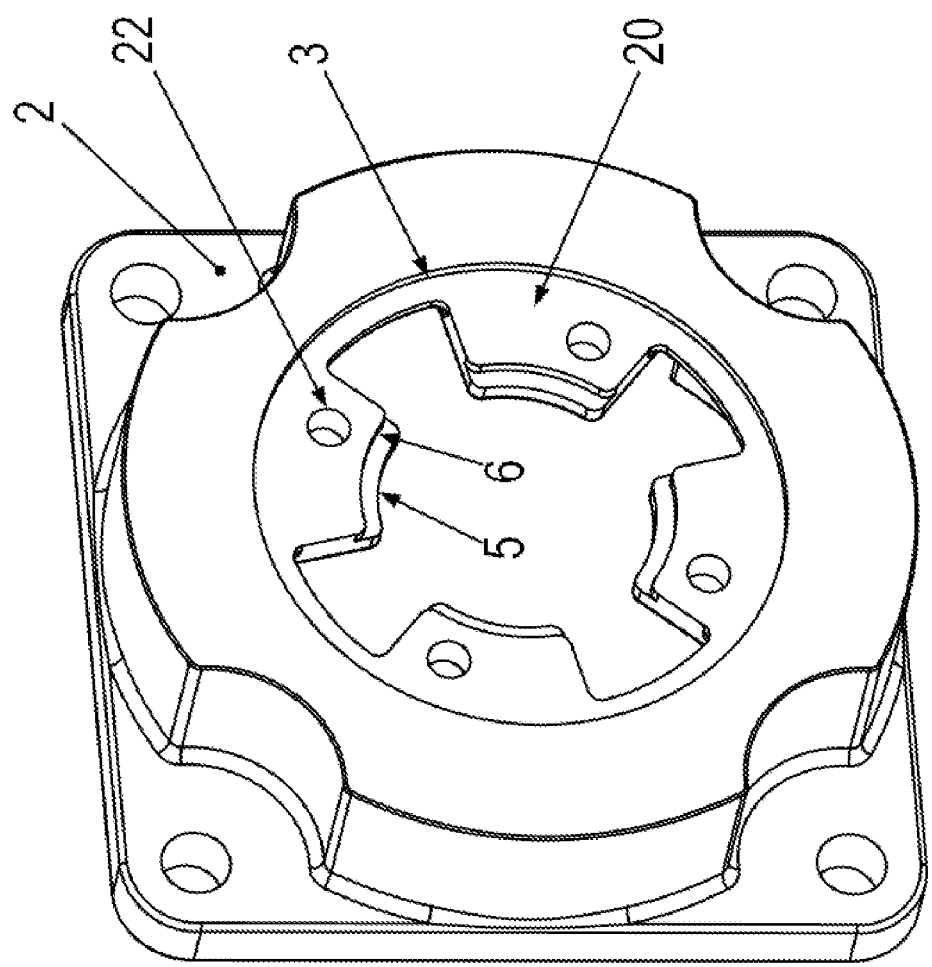
FIG. 25 is a perspective view of unmachined adapter part 2 including centering fins 140.

Adapter frame part 52 is illustrated in greater detail in FIGS. 11 and 12. The recess of adapter frame part 52, which is arranged as a centrically positioned, axially uninterrupted round hole, accommodates centering ring 53 of third motor 51 and in the process centers adapter frame part 52 with respect to third motor 51. On the side of adapter frame part 52 facing away from third motor 51, centering ring 120 arranged on adapter frame part 52 is accommodated in second centering step 3 of adapter part 2. Thus, adapter frame part 52 is centered with respect to adapter part 2.

In further exemplary embodiments, adapter part 2 has an axially protruding lug that at least partly projects into elongated hole 21 so that the relative orientation of adapter part 2, e.g., measured in the circumferential direction, with respect to adapter frame part 52 is able to be fixed in position with form locking.

However, in further exemplary embodiments, the gear unit is alternatively also arranged as a parallel-shaft gear unit or an angular gear unit.

LIST OF REFERENCE NUMERALS 1 first motor
2 adapter part, e.g., adapter housing part
3 second centering step on adapter part 2
4 centering ring of first motor 1
5 round hole, e.g., round hole extending through adapter part 2
6 first centering step on adapter part 2
7 screw
20 projection protruding in the radially inward direction
21 elongated hole
22 uninterrupted recess, e.g., hole, for screw 7
23 recess on adapter part 2
30 screw
31 second motor
32 centering ring of second motor 31
50 screw
51 third motor
52 adapter frame part
53 centering ring of third motor 51
70 flash leaf
120 centering ring of adapter frame part 52 for third centering step 3 of adapter part 2
121 round hole for the centering of centering ring 53 of third motor 51

The invention claimed is:

1. A geared motor, comprising:
a gear unit;
a selective one of a first, a second, and a third electric motor; and
an adapter part arranged between the gear unit and the selective one of the first, the second, and the third electric motors, the adapter part including a first, a second, and a third centering device on a side facing the selective one of the first, the second, and the third electric motors and being connected to the gear unit on a side facing away from the selective one of the first, the second, and the third electric motors;
wherein the first, the second, and the third centering devices are arranged concentrically with respect to each other and are radially set apart from one another, and the second centering device is arranged radially between the first centering device and the third centering device; and
wherein each of the selective one of the first, second, and third electric motors has a respective axially protruding centering ring centered by only a corresponding single one of the centering devices of the adapter part, and the other two of the centering devices are radially set apart from the centering ring and/or do not center the selective one of the first, second, and third electric motors.

2. The geared motor according to claim 1, wherein the adapter part is connected to a housing of the gear unit on the side facing away from the selective one of the first, second, and third electric motors.

3. The geared motor according to claim 1, wherein the radial direction corresponds to a radial direction relative to an axis of rotation of the selective one of the first, second, and third electric motors.

4. The geared motor according to claim 1, wherein a region covered by the adapter part in an axial direction overlaps with a region covered by a rotor of the geared motor in the axial direction.

5. The geared motor according to claim 1, wherein the first centering device includes a round hole that axially penetrates the adapter part, the second centering device includes a first centering step provided on the adapter part, and the third centering device includes a second centering step provided on the adapter part.

6. The geared motor according to claim 5, wherein, in a circumferential direction, edges of the round hole, the first centering step, and the second centering step extend with interruptions.

7. The geared motor according to claim 5, wherein the first centering step is adapted to accommodate and center the centering ring of the second electric motor, the centering ring of the second electric motor having a greater diameter than the centering ring of the first electric motor.

8. The geared motor according to claim 5, wherein the second centering step is adapted to accommodate and center the centering ring of an adapter frame part of the third electric motor, the centering ring of the adapter frame part having a greater diameter than the centering ring of the second electric motor, a round hole adapted to accommodate and center the centering ring of the third electric motor is arranged on the adapter frame part, a radial distance region covered by the centering ring of the third electric motor is arranged radially outside a radial distance region covered by the centering ring of the second electric motor.

9. The geared motor according to claim 5, wherein a housing of the first motor is accommodated in the second centering step with existing play in the radial direction.

10. The geared motor according to claim 1, wherein the adapter part is pressed toward the selective one of the first, second, and third electric motors by screws and/or by screw heads of screws, the screws being at least partly screwed into a respective, axially directed, threaded bore of the electric motor.

11. The geared motor according to claim 10, wherein the adapter part includes elongated holes arranged at a second radial distance, and uninterrupted round holes arranged at a first radial distance, the second radial distance being greater than the first radial distance, and the screws (a) project through the uninterrupted holes, and the elongated holes are sealed by material of the adapter part, or (b) project through the elongated holes, the elongated holes having an uninterrupted configuration.

12. The geared motor according to claim 11, wherein the elongated holes have a greater extension in the radial direction than in the circumferential direction.

13. The geared motor according to claim 11, wherein the uninterrupted holes and the elongated holes are arranged in radially inwardly protruding projections provided on the adapter part.

14. The geared motor according to claim 11, wherein a radial distance region covered by the elongated holes encompasses and/or contains a greatest radial distance of a contact surface between the first electric motor and the adapter part.

15. The geared motor according to claim 11, wherein at least one of the round holes is adapted to accommodate and center the centering ring of the first electric motor.

16. The geared motor according to claim 11, wherein the material has a wall thickness between 0.2 mm and 0.8 mm and/or between 0.3 mm and 0.5 mm.

17. The geared motor according to claim 11, wherein the adapter part has an axially protruding projection that projects at least partly into one of the elongated holes.

18. The geared motor according to claim 1, wherein the adapter part is arranged as a pressure die casting part and/or a pressure die casting zinc part.

19. A method for manufacturing a geared motor of a geared motor series, comprising:
producing the geared motor from an adapter part, a gear unit, and a selective one of a first, a second or a third electric motor, the adapter part being arranged between the gear unit and the selected electric motor, the adapter part having a first, a second and a third centering device on a side facing the selected electric motor and is connected to the gear unit and/or a housing of the gear unit on a side facing away from the selected electric motor, the centering devices being arranged concentrically with respect to each other and being radially set apart from one another, the second centering device being arranged radially between the first centering device and the third centering device, each of the selective one of the first, second, and third electric motors having a respective axially protruding centering ring adapted to center the selected electric motor by only a corresponding single one of the centering devices of the adapter part, when the selected electric motor is connected to the adapter part, and the other centering devices are radially set apart from the centering ring and/or do not center the selected electric motor.

20. A geared motor, comprising:
a gear unit;
a selective one of a first, a second, and a third electric motor; and
an adapter part arranged between the gear unit and the selective one of the first, the second, and the third electric motors, the adapter part including a first, a second, and a third centering device on a side of the adapter part facing the selective one of the first, the second, and the third electric motors and being connected to the gear unit on a side of the adapter part facing away from the selective one of the first, the second, and the third electric motors;
wherein the first, the second, and the third centering devices are arranged concentrically with respect to each other and are radially set apart from one another, and the second centering device is arranged radially between the first centering device and the third centering device; and
wherein each of the selective one of the first, second, and third electric motors has a respective axially protruding centering ring centered by only a corresponding single one of the centering devices of the adapter part, and the other two of the centering devices are radially set apart from the centering ring and/or do not center the selective one of the first, second, and third electric motors.

21. A geared motor, comprising:
a gear unit;
a selective one of a first, a second, and a third electric motor; and
an adapter part arranged between the gear unit and the selective one of the first, the second, and the third electric motors, the adapter part including a first, a second, and a third centering device on a side of the adapter part facing the selective one of the first, the second, and the third electric motors and being connected to the gear unit on a side of the adapter part facing away from the selective one of the first, the second, and the third electric motors;
wherein the first, the second, and the third centering devices are arranged concentrically with respect to each other and are radially set apart from one another, and the second centering device is arranged radially between the first centering device and the third centering device; and
wherein the first electric motor has a first axially protruding centering ring centered only by the first centering device of the adapter part, and the second and third centering devices are radially set apart from the first axially protruding centering ring;
wherein the second electric motor has a second axially protruding centering ring centered only by the second centering device of the adapter part, and the first and third centering devices are radially set apart from the second axially protruding centering ring; and
wherein the third electric motor has a third axially protruding centering ring centered only by the third centering device of the adapter part, and the first and second centering devices are radially set apart from the third axially protruding centering ring.

* * * * *